(12) United States Patent
Chan et al.

(10) Patent No.: US 6,235,206 B1
(45) Date of Patent: May 22, 2001

(54) METHOD FOR INACTIVATING RED TIDE ALGAE AND HARMFUL DINOFLAGELLATES

(76) Inventors: Yi Ping Chan, 64-29 136th St., Flushing, NY (US) 11367; Bernice W. Y. Leung, 3A Wiltshire Road, Kowloon Tong (HK)

( * ) Notice: Subject to any disclaimer, the term of this patent is extended or adjusted under 35 U.S.C. 154(b) by 0 days.

(21) Appl. No.: 09/088,891

(22) Filed: Jun. 2, 1998

(51) Int. Cl.[7] .................................................. C02F 1/78
(52) U.S. Cl. ..................... 210/739; 210/747; 210/748; 210/760; 210/764; 210/765
(58) Field of Search .................................. 210/739, 747, 210/748, 760, 764, 765

(56) References Cited

U.S. PATENT DOCUMENTS

| | | | |
|---|---|---|---|
| 3,505,213 | * 4/1970 | Anthony et al. | 210/760 |
| 4,172,786 | * 10/1979 | Humphrey et al. | 210/760 |
| 5,106,497 | * 4/1992 | Finnegan | 210/192 |
| 5,273,664 | * 12/1993 | Schulz | 210/759 |
| 5,493,743 | * 2/1996 | Schneider et al. | 68/207 |
| 5,683,576 | * 11/1997 | Olsen | 210/138 |
| 5,695,635 | * 12/1997 | Sasaki et al. | 210/192 |
| 5,711,887 | * 1/1998 | Gastman et al. | 210/748 |
| 5,785,864 | * 7/1998 | Teran et al. | 210/739 |
| 5,851,407 | * 12/1998 | Bowman et al. | 210/96.1 |
| 5,942,161 | * 8/1999 | Pate | 261/91 |

* cited by examiner

Primary Examiner—Peter A. Hruskoci
(74) Attorney, Agent, or Firm—Truong Dinh

(57) ABSTRACT

A method and system for inactivating harmful organisms (e.g., red tide algae and dinoflagellates). The method includes the steps of supplying ambient air to a conditioning unit to generate conditioned air; passing the conditioned air to an ozone generator to generate ozone; mixing the ozone with water, from a water source, that contains the harmful organisms to generate ozonated water; delivering the ozonated water back to the water source to achieve dilution of the harmful organisms; at least partially isolating the water source from external water to prevent quick dilution of the ozonated water; and continually circulating water in the water source through the mixing step. The harmful organisms are inactivated by exposure to the ozone.

14 Claims, 1 Drawing Sheet

METHOD FOR INACTIVATING RED TIDE ALGAE AND HARMFUL DINOFLAGELLATES

BACKGROUND OF THE INVENTION

I. Field of the Invention

The present invention relates to a technique for inactivating organisms and more particularly to a method and system for inactivating red tide algae and harmful dinoflagellates.

II. Description of the Related Art

Ozone is a tri-atomic oxygen ($O_3$) gas that is created commercially when oxygen ($O_2$) is exposed to a high-voltage electrical discharge. Ozone is a powerful oxidizing agent that is highly efficient in the removal of soil and other contamination materials (e.g., from textiles). This property makes ozone especially suited for washing laundry. The application of ozone to commercial laundry system is disclosed in U.S. Pat. No. 5,493,743, entitled "OZONE ASSISTED LAUNDRY WASH PROCESS AND WASTE WATER TREATMENT SYSTEM", issued Feb. 27, 1996; U.S. Pat. No. 5,241,720 entitled "LAUNDRY WASTE WATER TREATMENT AND WASH PROCESS", issued Sep. 7, 1993; U.S. Pat. No. 5,181,399, entitled "LAUNDRY WASTE WATER TREATMENT AND WASH APPARATUS", issued Jan. 26, 1996; and U.S. Pat. No. 5,097,556, entitled "LAUNDRY WASTE WATER TREATMENT AND WASH PROCESS", issued Mar. 24, 1992. These patents are incorporated herein by reference.

In a seemingly unrelated field, red tide algae and other harmful dinoflagellates are organisms that usually live below the water surface (i.e., three to four feet below the surface). Red tide algae and dinoflagellates generate odor naturally in warm temperature and absorb organic compounds in water. Red tide algae and dinoflagellates also consume oxygen in the water, thereby depleting the oxygen content and causing fishes (and others) to die due to lack of oxygen. In addition, red tide algae can attach to the gill of fishes. This can cause infection in fishes that can eventually lead to death.

Therefore, it is desirable to provide a method and process to inactivate red tide algae and harmful dinoflagellates without harming the fishes.

SUMMARY OF THE INVENTION

The inventors of the present invention have discovered an unusual application of a relatively obscure technology—the use of ozone to inactivate red tide algae and harmful dinoflagellates. The inventors reached the present invention through the realization that: (1) ozone is one of the most powerful oxidizing agent known; (2) ozone is a disinfectant and biocide that kills viruses and potential pathogenic microbiological organisms such as bacteria; (3) ozone can be used to inactivate red tide algae and harmful dinoflagellates; and (4) ozone can provide oxygen to the water supply, thereby improving the conditions for fishes, shellfish, and others.

The present invention provides a method for inactivating harmful organisms (e.g., red tide algae and dinoflagellates). The method includes the steps of supplying ambient air to a "conditioning" unit to generate conditioned air; passing the conditioned air to an ozone generator to generate ozone; mixing the ozone with water, from a water source, that contains the harmful organisms to generate ozonated water; delivering the ozonated water back to the water source to achieve dilution of the harmful organisms; at least partially isolating the water source from external water to prevent quick dilution of the ozonated water; and continually circulating water in the water source through the mixing step. The harmful organisms are inactivated by exposure to the ozone.

The present invention further provides a system for inactivating harmful organisms. The system includes a "conditioning" unit for receiving ambient air and providing conditioned air; an ozone generator coupled to the conditioning unit for receiving the conditioned air and generating ozone; an injector operably coupled to the ozone generator for receiving the ozone and also operably coupled to a water source for receiving water that contains harmful organisms, the injector mixing the ozone with the water to generate ozonated water; an ozone sensor for measuring an ozone concentration level in the water source; and an ozone monitor coupled to the ozone sensor and operably coupled to the injector, the ozone monitor generating a signal indicative of the ozone concentration level in the water source. Again, the harmful organisms are inactivated by exposure to the ozone.

The foregoing, together with other features and advantages of this invention, will become more apparent when referring to the following specification, claims and the accompanying drawings.

BRIEF DESCRIPTION OF THE DRAWINGS

The features and advantages of the present invention will become more apparent from the detailed description set forth below when taken in conjunction with the drawing in which like reference characters identify correspondingly throughout and wherein.

DETAILED DESCRIPTION OF SPECIFIC EMBODIMENTS

Figure 1:
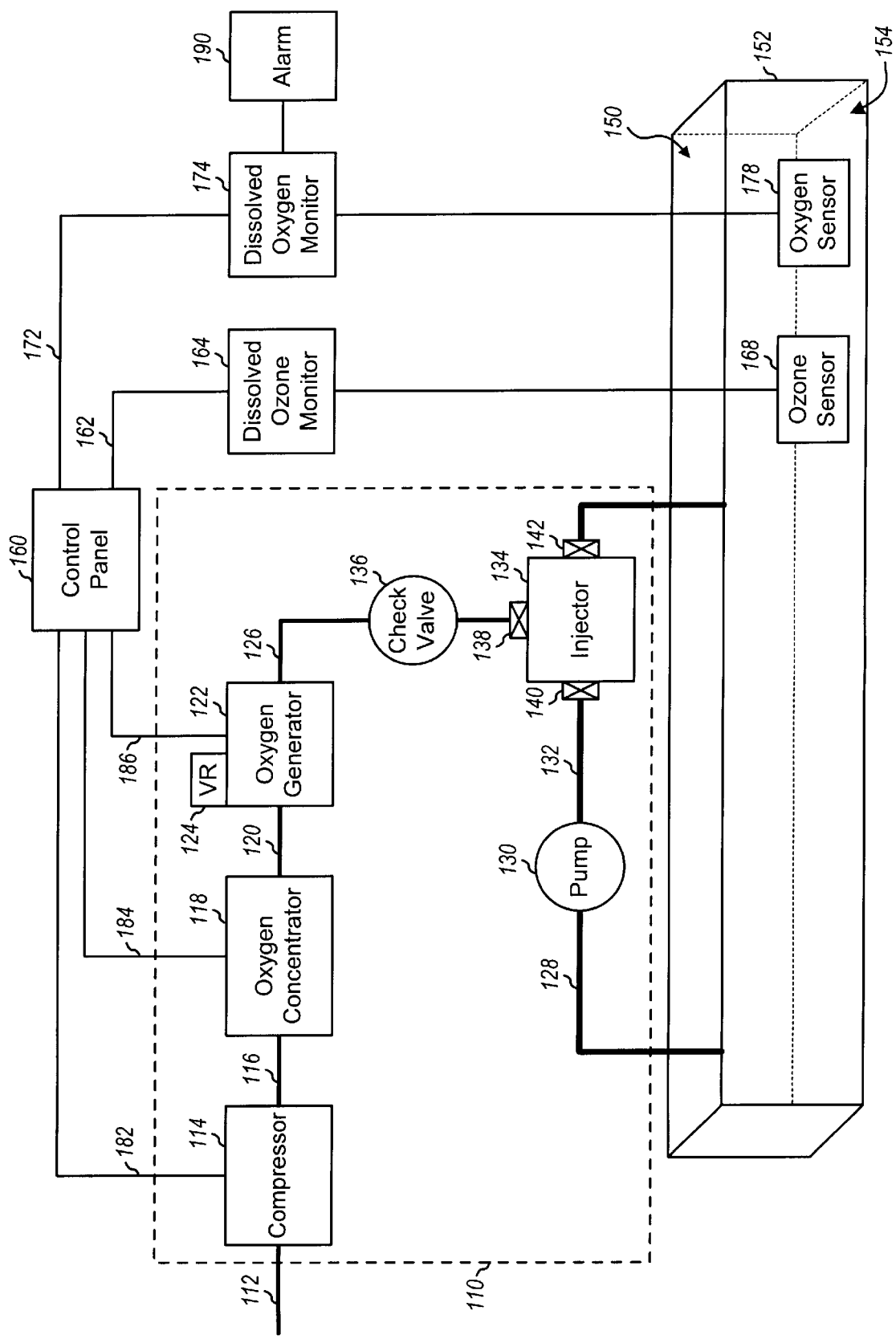
FIG. 1 illustrates one embodiment of an ozone system for inactivating red tide algae and dinoflagellates.

FIG. 1 illustrates one embodiment of an ozone system 100 for inactivating red tide algae and dinoflagellates. Ozone system 100 includes an ozonated subsystem 110, various monitors, a control panel, sensors, and a special net.

Within ozonated subsystem 110, ambient air is provided through an inlet 112 to a compressor 114. It is well known in ozone generation that drier air and higher oxygen concentration in the air result in more ozone being produced. Therefore, it is advantageous to control the moisture content of the incoming air by controlling the temperature of the air. This is accomplished by passing the ambient air through compressor 114. Compressor 114 can also be a conventional air conditioning unit. The dried and cooled air is then passed through a line 116 to an (optional) oxygen concentrator 118 that separates nitrogen from oxygen. Oxygen concentrator 118 increases the oxygen concentration of the air (i.e., possibly from 20% to 80–90%). Compressor 114 and oxygen concentrator 118 are examples of "conditioning" units that condition the air to produce the desired air characteristics. Other "conditioning" units can also be used.

The high oxygen content and dried air is then fed over through a line 120 to an ozone generator 122. In one embodiment, ozone generator 122 produces a high-voltage electric discharge that disassociates an oxygen molecule into two oxygen atoms. Ozone ($O_3$) is formed when one of these oxygen atoms simultaneously collides with two molecules, one of which is oxygen ($O_2$). The amount of ozone produced can be controlled or varied by adjusting a voltage regulator (VR) 124 that is coupled to ozone generator 122. The generation of ozone using high-voltage electric discharge is described in the aforementioned U.S. Pat. No. 5,097,556.

The ozone is then passed through a kynar tube 126 and mixed with water by means of an injector or a pump, or both. Sea or fresh water is drawn via an inflow flexible hose 128 by a vacuum or piston pump 130 and provided through a line 132 to an injector 134. The ozone in kynar tube 126 can be provided through an optional check valve 136 to injector 134. Check valve 136 prevents the back-flow of water from entering ozone generator 122.

Injector 134 uses its efficient ability to create a vacuum at its suction port 138 to generate the desired suction for the ozone. This vacuum is created by a small amount of differential pressure between an inlet 140 and an outlet 142 of injector 134. When pressurized water enters inlet 140, it constricts toward an injection chamber within injector 134 and changes into a high velocity jet stream. The increase in velocity through the injection chamber, as a result of the differential pressure, causes a decrease in pressure in the injection chamber. This pressure drop enables ozone to be drawn through suction port 138 and dynamically injected into the moving jet stream. At this point, the red tide algae, harmful dinoflagellates, or other living organism are disinfected by the ozone and die instantly or soon thereafter. The disinfection is effective when the concentration of ozone is maintained above a predetermined threshold. The ozonated water is then injected through outlet 142, through an outflow flexible hose 144, and back to a water source 150. Water source 150 is a holding facility that holds fresh water or seawater. Water source 150 can be an enclosed water source of an open water source.

The water within water source 150 continually circulates via inflow flexible hose 128 and outflow flexible hose 144 unless ozone system 100 is turned off either automatically by a control mechanism described below or manually. The control mechanism monitors the ozone and oxygen content and adjust the operation of ozonated subsystem 110 accordingly to provide the desired condition. A control panel 160 couples via wire 162 to a dissolved ozone monitor 164. Dissolved ozone monitor 164 continually measures, via an ozone sensor 168, the dissolved ozone level in the water within water source 150. Predetermined high and low ozone thresholds are used to respectively turn off and on ozonated subsystem 110 to maintain an optimal amount of ozone in the water.

Similarly, control panel 110 couples via wire 172 to a dissolved oxygen monitor 174. Dissolved oxygen monitor 174 is used to determine the oxygen content in the water. Detection of the oxygen content in the water is performed by an oxygen sensor 178. If the oxygen content falls below a low oxygen threshold, fishes can die from de-oxygenation. Also, when red tide algae appears in the water, it consumes oxygen in the water and causes the oxygen content to deplete. If the oxygen content falls below a predetermined low oxygen threshold, dissolved oxygen monitor 174 signals this condition to control panel 160 which can then turns on ozonated subsystem 110 via control signals over wires 182, 184, and 186. Concurrently, an optional alarm 190 can turn on in response to this low oxygen content condition to alert fishermen or operators. Alternatively, dissolved oxygen monitor 174 can also request control panel 160 to turn off ozonated subsystem 110 when the oxygen content exceeds a predetermined high oxygen threshold. Thus, energy can be conserved when ozonated subsystem 110 is not required.

In some embodiment, water source 150 is enclosed by a special (but optional) open bottom net 152. Open bottom net 152 can be made of flexible material (i.e., a nylon sheet) to prevent dilution of the enclosed and ozonated water with water from outside water source 150. Open bottom net 152 can also include an open bottom 154 to allow the exchange of normal water (i.e., without the red tide algae) below the water surface. The depth of open bottom net 152 depends on the characteristics of the red tide algae or dinoflagellates. In an example application, open bottom net 152 allows exchange of water at five feet below the water surface.

By enclosing the fish cultivation area with open bottom net 152, the process reduces the exchange of the internal water with the outside contaminated water. Enclosing water source 150 also helps maintain the ozone concentration at or near the optimal level. Open bottom net 152 help maintains the ozone concentration required to kill the red tide algae. In an enclosed environment (i.e., with no other water coming in) open bottom net 152 is an optional item. In some other environments, open bottom net 152 may not be needed.

The present invention provides a process to effectively inactivate red tide algae and harmful dinoflagellates. By using an ozone generating subsystem, seawater or fresh water (i.e., containing red tide algae and harmful dinoflagellates) is pumped and mixed with ozone gas using an injector. The red tide algae and harmful dinoflagellates are inactivated upon contact with an appropriate concentration of ozone. The water is then released back into the holding facility, thereby diluting the existing bacteria count and reducing the oxygen demand in the water. The process continually circulates the water until the red tide algae and harmful dinoflagellates are inactivated to an acceptable level.

The present invention also beneficially increases the oxygen supply in the water via the ozone injection. Ordinarily, during the presence of red tide algae, a portion of the oxygen supply in the water is consumed, leaving little oxygen, if any, for fishes. With the present invention, the ozone (or tri-atomic oxygen $O_3$) that is injected into the water disinfects the red tide algae and then dissolved into ordinary oxygen ($O_2$). The dissolved oxygen from the ozone reaction remains in the water, thereby increasing the oxygen supply that is important to the survival of fishes. The present invention can increase the oxygen content in the water by a factor of up to two, or three, or possibly even more.

The control mechanism of the present invention provides the required performance while minimizing power consumption. The dissolved oxygen monitor and dissolved ozone monitor, along with the appropriate ozone and oxygen sensors, allow for automatic control of the system to protect fishes from excess ozone exposure, to save energy consumption, and to reduce cost. Ordinarily, without the presence of red tide algae, water is safe for fishes and the condition is normal. However, the oxygen content in water decreases during the presence of red tide algae, and for a short period after the red tide algae is inactivated. The dissolved oxygen monitor continually measures the oxygen content in water. If the oxygen falls below a predetermined low oxygen threshold, the oxygen monitor triggers an optional alarm and, concurrently, requests the control panel to turn on the ozonated subsystem. Alternatively, if the oxygen content exceeds the predetermined high oxygen threshold, the ozonated subsystem can be turn off temporarily to conserve energy.

Besides monitoring oxygen content, the control mechanism can also monitor ozone concentration in the water. Excess ozone exposure can be harmful to fishes and can even cause mortality. On the other extreme, low ozone concentration may not be effective in inactivating red tide algae and harmful dinoflagellates. The dissolved ozone monitor measures the ozone level in water and continually compares the measured level with the predetermined high and low ozone thresholds. If the ozone level exceeds the predetermined high ozone threshold, the dissolved ozone monitor signals the condition to the control panel. The control panel then shuts off the ozonated subsystem to discontinue the ozone production. Alternatively, if the ozone level is below the predetermined low ozone threshold, the ozonated subsystem is turned on to increase the ozone concentration in the water.

The present invention overcomes a technical challenge created by injecting ozone directly into open water. In particular, the challenge arises because ozone gas quickly dilutes in water and results in a low ozone concentration. With the use of a high speed jet stream, the red tide algae and harmful dinoflagellates are inactivated within the injector. The present invention also overcomes the challenge of preventing quick dilution of ozonated water. The use of the open bottom net reduces the rate of dilution.

The present invention can be used in an open water source or an enclosed water source. Examples of open water sources include, but are not limited to, a pond, a lake, a river, a sea, and an ocean. Examples of enclosed water sources include, but are not limited to, commercial tanks (i.e., restaurant, aquarium, office, fish shop, super-market, wet-market, food processing center, homes), an enclosed pond, and a pool.

Although the present invention has been described in the context of inactivating red tide algae and other harmful dinoflagellates, the present invention can be extended to inactivating other organisms, microorganisms (such as bacterial and viruses), and others. The organisms can be inactivated by using the strong disinfecting power of ozone to rupture the cells of these organisms.

In summary, the present invention provides a cost effective method and system for inactivating red tide algae and harmful dinoflagellates while concurrently increasing the dissolved oxygen content in water. Importantly, the fishes are not harmed by the process. As an additional benefit, the process converts ammonium in water into nitrates, thus reducing the possibility of a future red tide outbreak.

The previous description of the specific embodiments is provided to enable any person skilled in the art to make or use the present invention. The various modifications to these embodiments will be readily apparent to those skilled in the art, and the generic principles defined herein may be applied to other embodiments without the use of the inventive faculty. Accordingly, the drawings and detailed description are to be regarded as illustrative in nature and not as restrictive. Thus, the present invention is not intended to be limited to the embodiments shown herein but is to be accorded the widest scope consistent with the principles and novel features disclosed herein, and as indicated by the appended claims.

What is claimed is:

1. A method for inactivating harmful organisms in water comprising:
   generating ozone from air;
   injecting the ozone into water from a water source that contains the harmful organisms, wherein the harmful organisms comprise red tide algae or dinoflagellates, or both, and the water contains fishes or shellfish, or both;
   inactivating the harmful organisms by exposure to an appropriate concentration of the injected ozone; and
   maintaining the concentration of ozone in the ozonated water above a pass threshold determined effective to inactivate the harmful organisms without harming said fishes or shellfish.

2. The method of claim 1, further comprising:
   delivering the ozonated water back to the water source to achieve dilution of the harmful organisms; and
   continually circulating water in the water source through the injecting.

3. The method of claim 1, further comprising:
   monitoring an oxygen concentration level in the water source; and
   activating the generating and injecting if the oxygen level is below a low oxygen threshold.

4. The method of claim 1, further comprising:
   monitoring an ozone concentration level in the water source; and
   suspending the injecting if the ozone concentration level is above a high ozone threshold.

5. The method of claim 1, wherein the ozone generating comprises:
   supplying air to a conditioning unit to generate conditioned air;
   passing the conditioned air to an ozone generator to generate the ozone, wherein the ozone generator converts the conditioned air to ozone using a high voltage electric discharge.

6. The method of claim 5, wherein the ozone generator is controlled by a voltage regulator to produce a desired amount of ozone.

7. The method of claim 1, further comprising:
   at least partially isolating the water source from external water to prevent quick dilution of the ozonated water.

8. The method of claim 1, wherein the harmful organisms comprise bacteria or algae, or both.

9. The method of claim 1, wherein the harmful organisms are inactivated by rupturing cells of the organisms using a strong disinfection power of ozone.

10. The method of claim 1, further comprising:
    circulating the ozonated water into the water source to increase oxygen supply in the water source.

11. The method of claim 1, further comprising:
    oxidizing an available ammonium in the water source into nitrates to reduce a risk of future outbreak of the harmful organisms.

12. The method of claim 1, wherein the water source is an open water source.

13. The method of claim 1, wherein the water source is an enclosed water source.

14. A method for inactivating harmful organisms comprising:
    supplying air to a conditioning unit to generate conditioned air;
    passing the conditioned air to an ozone generator to generate ozone, wherein the ozone generator converts the conditioned air to ozone using a high voltage electric discharge;
    injecting the ozone into water from a water source that contains the harmful organisms, wherein the harmful organisms comprise red tide algae or dinoflagellates, or both, and the water contains fishes or shellfish, or both;
    inactivating the harmful organisms by exposure to an appropriate concentration of the injected ozone;
    maintaining the concentration of ozone in the ozonated water above a particular threshold determined effective to inactivate the harmful organisms without harming said fishes or shellfish;
    delivering the ozonated water back to the water source to achieve dilution of the harmful organisms;
    at least partially isolating the water source from external water to prevent quick dilution of the ozonated water; and
    continually circulating water in the water source through the injecting.

* * * * *